(12) United States Patent
Tsai

(10) Patent No.: US 8,994,702 B2
(45) Date of Patent: Mar. 31, 2015

(54) DISPLAY SYSTEM AND ASSOCIATED CONTROL METHOD

(75) Inventor: Meng-Che Tsai, Hsinchu Hsien (TW)

(73) Assignee: MStar Semiconductor, Inc., Hsinchu County (TW)

( * ) Notice: Subject to any disclaimer, the term of this patent is extended or adjusted under 35 U.S.C. 154(b) by 303 days.

(21) Appl. No.: 13/346,805

(22) Filed: Jan. 10, 2012

(65) Prior Publication Data

US 2012/0176349 A1 Jul. 12, 2012

(30) Foreign Application Priority Data

Jan. 11, 2011 (TW) .............................. 100101014 A

(51) Int. Cl.
*G09G 5/00* (2006.01)
*G06F 3/147* (2006.01)

(52) U.S. Cl.
CPC .......... *G06F 3/147* (2013.01); *G09G 2370/045* (2013.01); *G09G 2370/12* (2013.01); *G09G 2370/22* (2013.01)
USPC ............................ 345/204; 345/211; 345/212

(58) Field of Classification Search
None
See application file for complete search history.

(56) References Cited

U.S. PATENT DOCUMENTS

| 5,367,211 | A * | 11/1994 | Giordano et al. ............... 327/73 |
| 6,356,129 | B1 * | 3/2002 | O'Brien et al. ............... 327/175 |
| 2004/0233181 | A1 * | 11/2004 | Kobayashi .................... 345/204 |
| 2007/0200860 | A1 * | 8/2007 | Kobayashi .................... 345/520 |
| 2008/0218505 | A1 * | 9/2008 | Choi ............................... 345/212 |
| 2009/0079717 | A1 * | 3/2009 | Tsai .............................. 345/204 |
| 2009/0179883 | A1 * | 7/2009 | Goodart et al. ............... 345/211 |
| 2009/0322767 | A1 * | 12/2009 | Douglas et al. ............... 345/520 |
| 2010/0073384 | A1 * | 3/2010 | Kim et al. ...................... 345/520 |
| 2010/0079475 | A1 * | 4/2010 | Whitby-Strevens et al. .. 345/559 |
| 2010/0199298 | A1 * | 8/2010 | Kabuto et al. .................... 725/25 |
| 2011/0001744 | A1 * | 1/2011 | Chen et al. ..................... 345/212 |
| 2011/0057686 | A1 * | 3/2011 | Ueda .............................. 327/65 |
| 2011/0062794 | A1 * | 3/2011 | Vergoossen et al. .......... 307/125 |
| 2011/0128277 | A1 * | 6/2011 | Murakami ..................... 345/212 |
| 2011/0134024 | A1 * | 6/2011 | Park .............................. 345/156 |
| 2011/0156624 | A1 * | 6/2011 | Takai ........................ 318/400.04 |
| 2011/0316771 | A1 * | 12/2011 | Kume ........................... 345/156 |

FOREIGN PATENT DOCUMENTS

TW 200926133 A 6/2009
WO WO 2009144626 A1 * 12/2009

OTHER PUBLICATIONS

Taiwan Intellectual Property Office, "Office Action", Jun. 25, 2014.

* cited by examiner

*Primary Examiner* — Kathy Wang-Hurst
*Assistant Examiner* — Josemarie G Acha, III
(74) *Attorney, Agent, or Firm* — WPAT, PC; Justin King

(57) ABSTRACT

A display system capable of being coupled to a host includes: a display controller; a display port (DP), including a main link, an auxiliary channel and a signal detection end; a DP engine, coupled to the DP via the main link, the auxiliary channel and the signal detection end, for outputting an image signal to the display controller; and a detection circuit, coupled to the DP via the auxiliary channel, for selectively outputting an indication signal to the DP engine in response to a communication signal in the auxiliary signal pair in the auxiliary channel.

11 Claims, 5 Drawing Sheets

DISPLAY SYSTEM AND ASSOCIATED CONTROL METHOD

This application claims the benefit of Taiwan application Serial No. 100101014, filed Jan. 11, 2011, the subject matter of which is incorporated herein by reference.

BACKGROUND OF THE INVENTION

1. Field of the Invention

The invention relates in general to a display system and associated control method, and more particularly to a display system capable of detecting hot-plugging to a host via a DisplayPort interface when versions of DisplayPort standards adopted by the host and a display are different.

2. Description of the Related Art

An early-stage conventional display receives an analog Video Graphic Array (VGA) signal to display images, and the VGA signal is transmitted via a D-sub video port.

Accompanied with the prevalence of digital image data, video interfaces for transmitting digital data have been launched one after another. For example, the Digital Visual Interface (DVI) is announced in 1999, and is mainly targeted at replacing the prior VGA specification used for analog signals in the information technology (IT) industry. For another example, the High Definition Multimedia Interface (HDMI) is announced in 2002, and is mainly targeted at replacing the prior analog AV terminals and S terminals in the consumer electronics (CE) industry.

To enable a display to receive analog or digital image data of different specifications, different video interfaces are provided in the display. FIG. 1 shows a functional block diagram of a display system provided with various video interfaces. A display system 10 comprises a display controller 101, a D-sub engine 103, a DVI engine 105, an HDMI engine 107, a D-sub port 109, a DVI port 111, and an HDMI port 113.

Supposing analog image data outputted from a host (not shown) is to be displayed by the display system 10, and the analog image data is outputted by a D-sub port of the host, connectors (not shown) complying with D-sub interface are respectively connected to the D-sub port of the host (not shown) and the D-sub port 109 of the display system 10. Analog VGA signals outputted from the host are then transmitted to the D-sub engine 103 to generate image signals to the display controller 101 to display images. Similarly, supposing digital image data outputted from a host is to be displayed by the display system 10, and the digital image data is outputted by a DVI port of the host, connectors (not shown) complying with a DVI interface are respectively connected to the DVI port of the host (not shown) and the DVI port 111 of the display system 10. The digital image data outputted from the host is then transmitted to the DVI engine 105 to generate images signals to the display controller 101 to display images. Similarly, supposing digital image data outputted from a host is to be displayed by the display system 10, and the digital image data is outputted by an HDMI port of the host (not shown), connectors (not shown) complying with an HDMI interface are respectively connected to the HDMI port of the host (not shown) and the HDMI port 113 of the display system 10. The digital image data outputted from the host is then transmitted to the HDMI engine 107 to generate images signals to the display controller 101 to display images.

It is observed from the above that, more and more different video interfaces are necessarily provided in a display to accommodate the growing types of video interfaces, such that not only an overall cost is increased but also usage complications are incurred.

To solve the abovementioned complications, the Video Electronics Standards Association (VESA) proposed a new video interface that can be applied in both the IT and CE industries—the new video interface is the DisplayPort standard for replacing the DVI and HDMI standards. One distinct feature of the DisplayPort interface is that the DisplayPort standard is a royalty-free open source, so that all companies can join the VESA for free and participate in modifying and defining the DisplayPort specifications.

FIG. 2 shows a schematic diagram of a signal channel between a host 21 and a display 23 in a DisplayPort interface. Digital image data is transmitted to a display port (DP) 235 and processed by a DP engine (not shown) in the display 23 to generate image signals that are then displayed on the display 23.

In the DisplayPort specifications, a signal channel comprises a main link and an auxiliary channel. The main link handles transmission of image data and is a high-speed one-directional output. The main link comprises four data pairs, each of which comprising two lanes and providing a bandwidth of 2.7 Gbps, so that the four data pairs provide a bandwidth up to 10.8 Gpbs. The auxiliary channel comprises an auxiliary signal pair, which handles information in addition to image data, for example, including status information, control commands, and audio frequencies. The auxiliary channel provides a low-speed bi-directional communication channel for communications between the host 21 and the display 23 before the main link starts to transmit image data. Signals in the main link and the auxiliary channel are differential signals. Further, in the DisplayPort standard, a signal detection end is for outputting a signal detection methodology (SDM) that is mainly for detecting hot-plugging between the host 21 and the display 23 in the DisplayPort version 1.0.

In the DisplayPort version 1.0, the display 23 first detects a level of the SDM to identify whether the display 23 is hot-plugged to the host 21. When it is detected that the display 23 is hot-plugged to the host 21, the host 21 sends a communication signal using an auxiliary signal pair in the auxiliary channel to the display 23 to communicate between the host 21 and the display 23. When the communication between the host 21 and the display 23 is established, the host 21 is allowed to transmit image data to the display 23 via the main link.

However, as stated, DisplayPort is a royalty-free open standard, and all companies can join the VESA for free and participate in modifying and defining the DisplayPort specifications, so that different version of DisplayPort have different definitions for the SDM. In DisplayPort version 1.0, the SDM is used for hot-plug detection between a host 21 and a display 23; yet, in DisplayPort version 1.1 or 1.1a, the SDM serves other functions. Therefore, once the DisplayPort interface standard (e.g., version 1.0) used by the host 21 is different from the DisplayPort interface standard (e.g., version 1.1 or 1.1a) used by the display 23, the display 23 cannot learn whether the display 23 is hot-plugged to the host 21 via the SDM.

SUMMARY OF THE INVENTION

According to an aspect of the present invention, a display system capable of being coupled to a host complying with different versions of the DisplayPort standard is provided. The display system comprises: a display controller; a display port (DP), comprising a main link, an auxiliary channel and a signal detection end; a DP engine, coupled to the DP via the main link, the auxiliary channel and the signal detection end, for outputting an image signal to the display controller; and a detection circuit, coupled to the DP via the auxiliary channel, for detecting whether a communication signal is present in an auxiliary signal pair in the auxiliary channel to selectively assert an indication signal to the DP engine.

According to another aspect of the present invention, a method for controlling a display system is provided. The display system comprises a first DP connected to a second DP of a host. The method comprises steps of: obtaining a signal difference between an auxiliary signal pair in an auxiliary channel, generating an indication signal of a first level when the signal difference is incremental and is greater than a first number, and generating the indication signal of a second level when the signal difference is decremental and is smaller than a second number. The first number is greater than the second number, and when the indication signal is at the first level, it is determined that a communication signal in the auxiliary signal pair is present.

The above and other aspects of the invention will become better understood with regard to the following detailed description of the preferred but non-limiting embodiments. The following description is made with reference to the accompanying drawings.

DETAILED DESCRIPTION OF THE INVENTION

To overcome the issue that a host is incapable of learning whether a display is hot-plugged to a host when versions of the DisplayPort standard adopted by the display and host are different, the present invention provides a display system that utilizes a communication signal outputted by an auxiliary channel to determine whether the display is hot-plugged to the host.

Figure 1:
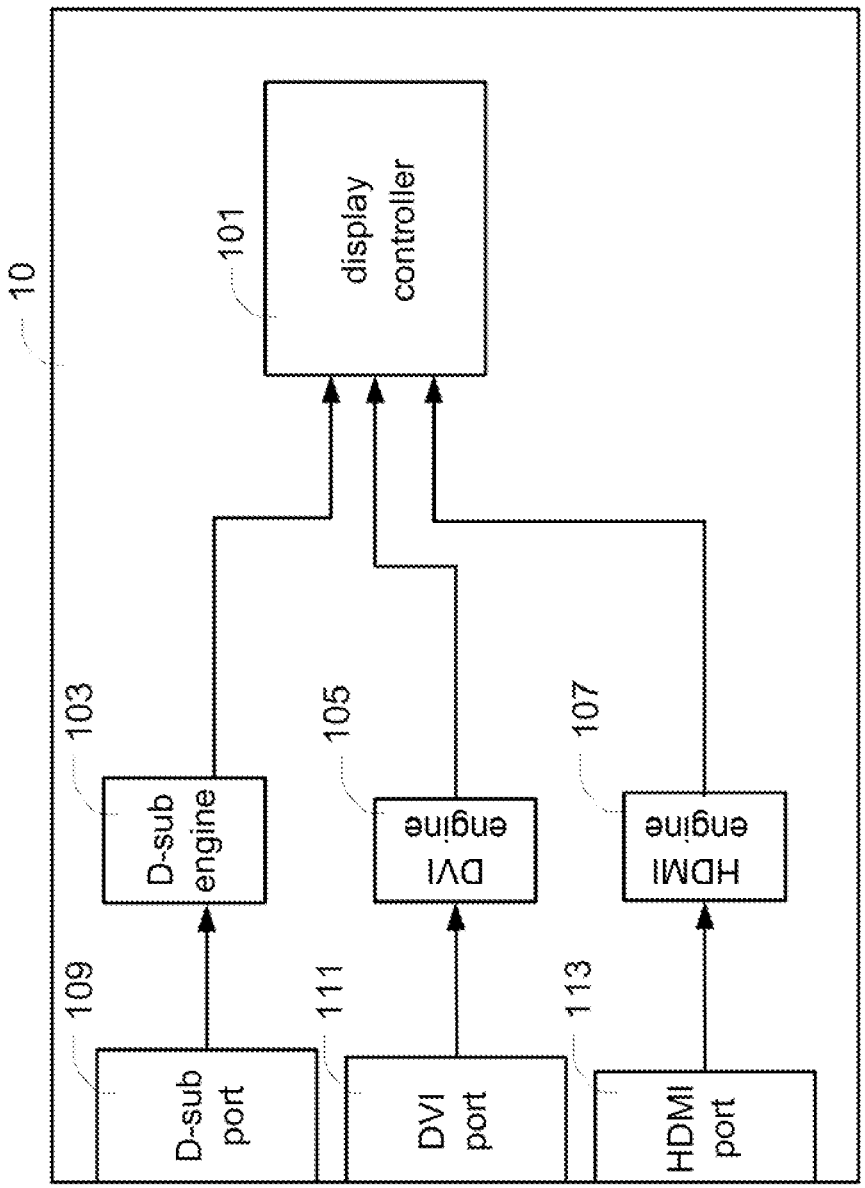
FIG. 1 is a block diagram of a conventional display system provided with several video interfaces.
Figure 2:
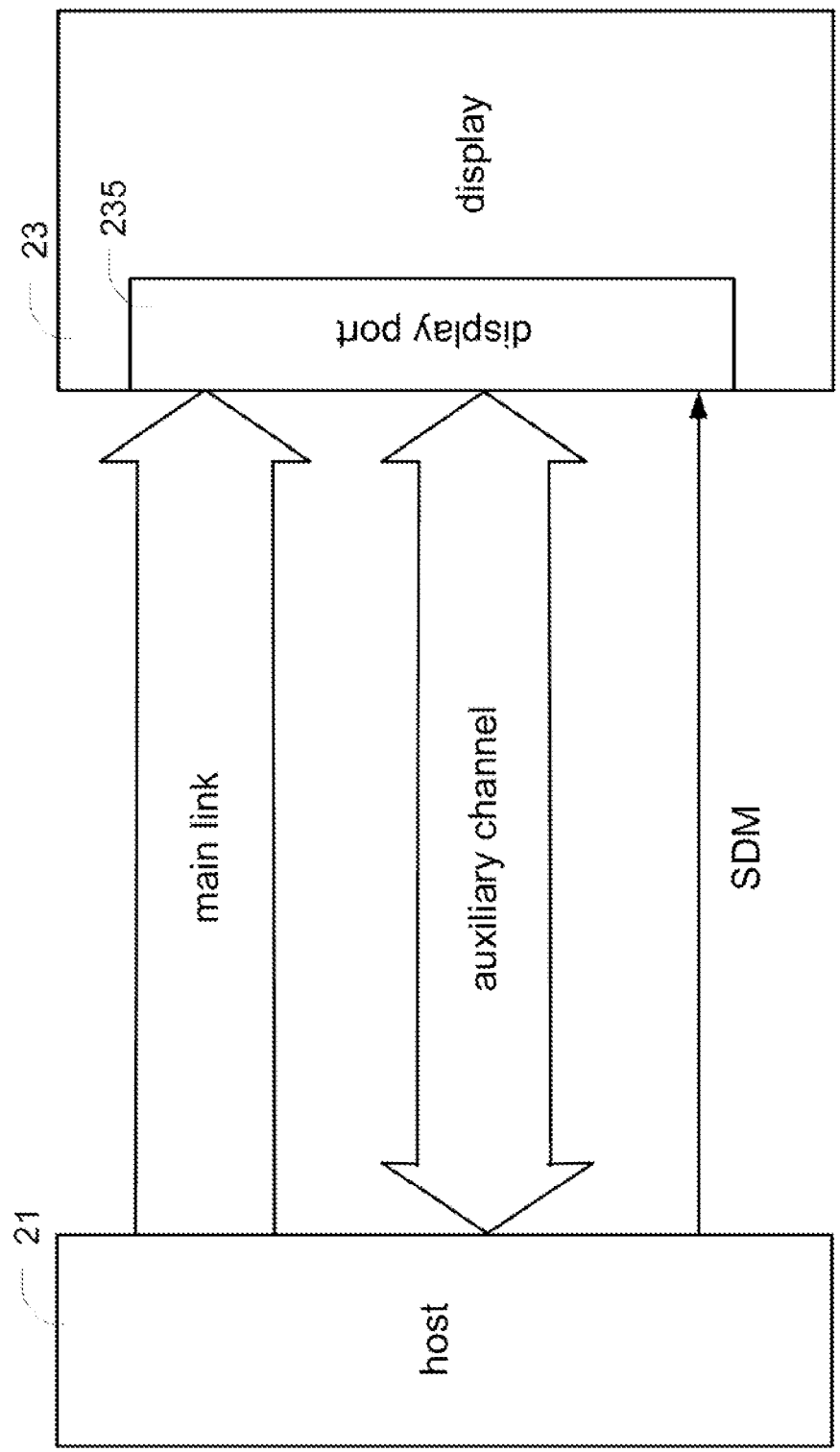
FIG. 2 is a schematic diagram of signal channels between a host and a display in a DisplayPort interface.
Figure 3:
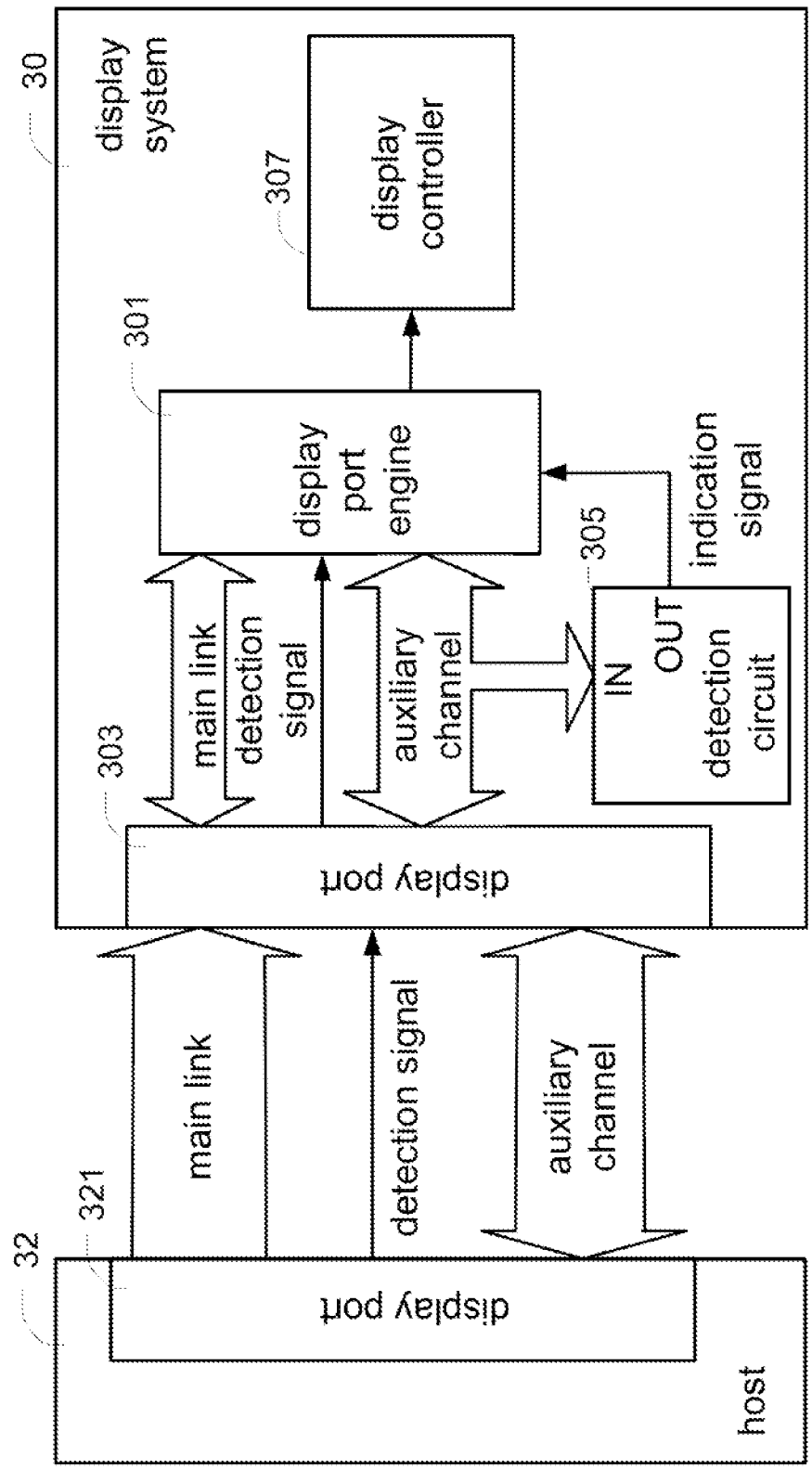
FIG. 3 is a block diagram of a display system according to an embodiment of the present invention.

FIG. 3 shows a block diagram of a display system 30 according to an embodiment of the present invention. The display system 30 comprises a display controller 307, a display port (DP) engine 301, a DP 303, and a detection circuit 305. A host 32 comprises a DP 321. An auxiliary signal pair is a pair of differential signals comprising a positive auxiliary signal end AUX+ and a negative auxiliary signal end AUX−. The auxiliary signal pair sent by the host 32 is connected to an input IN of the detection circuit 305 via the DP 303. An output OUT of the detection circuit 305 is connected to the DP engine 301, to output an indication signal.

When the display system 30 is not connected with the host 32, the DP 303 cannot receive a communication signal from the auxiliary channel, and noise is present on the auxiliary signal pair. When the display system 30 is connected to the host 32, before the host 32 transmits image data via the main link, the host 32 first sends a communication signal via the positive auxiliary signal end AUX+ and the negative auxiliary signal end AUX− to the DP 303 to establish communication between the host 32 and the display system 30. The communication signal is monitored by the detection circuit 305, and an indication signal of a first level is outputted from the output OUT to the DP engine 301.

In this embodiment, the display system 30 learns whether the display system 30 is hot-plugged to the host 32 via the communication signal in the auxiliary channel sent by the host 32. When the display system 30 is connected to the host 32, the host 32 starts sending the communication signal to the DP 303 to establish communication between the host 32 and the display system 30. When the input IN of the detection circuit 305 observes the communication signal in the auxiliary signal pair, the output OUT of the detection signal outputs the indication signal of the first level, so that the display system 30 accordingly learns that the display system 30 is hot-plugged to the host 32.

For example, the indication signal is an enable signal for enabling the DP engine 301. More specifically, the enable signal as the indication signal is for activating the DP engine 301, so that the DP engine 301 stays inactive when no signal is received for power saving. When the display system 30 is connected to the host 32, the host 32 start sending the communication signal to the DP 303 to establish communication between the host 32 and the display system 30. When the input IN of the detection circuit 305 receives the communication signal, the output OUT of the detection circuit 305 outputs the indication signal of the first level to activate the DP engine 301.

In another embodiment, the display controller 307 keeps scanning all display engines in a display system 30 to learn whether the display system 30 is connected to a host 32. For example, the display controller first scans a D-sub engine (not shown) to learn whether the display system 30 is connected to the host 32 via a D-sub interface. Supposing the display system 30 is not connected to the host via the D-sub interface, the display controller next scans a DVI engine (not shown) to learn whether the display system 30 is connected to the host via a DVI interface, so forth. Through scanning the output signal from the output OUT of the detection circuit 305 by the display controller 307, whether the display system 30 is connected to the host 32 via the DP port can be acquired. That is, the display controller 307 learns that the display system 30 is connected to the host 32 via the DP 303 when the indication signal scanned by the display controller 307 is the first level; conversely, the display controller 307 learns that the display system 30 is not connected to the host 32 via the DP 303 when the indication signal scanned by the display controller 307 is the second level, and the display controller 307 continues to scan other engines so that the display controller 307 can quickly learn whether the display system 30 is connected to the host 32 via the DP 303.

Figure 4A:
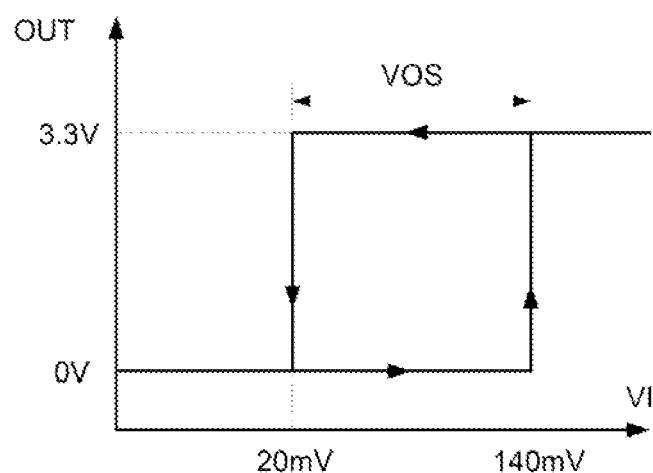
FIG. 4A is a diagram of a transfer function of a detection circuit according to an embodiment of the present invention.

FIG. 4A shows a diagram of a transfer function of the detection circuit according to one embodiment of the present invention. VI is an absolute value of a voltage difference between the positive auxiliary signal end AUX+ and the negative auxiliary signal end AUX−, as:

$$VI=|(AUX+)-(AUX-)|$$

The transfer function comprises hysteresis characteristics, and a voltage offset (VOS) of the hysteresis is preferably between 20 mV and 140 mV. Alternatively, the hysteresis VOS may be appropriately adjusted according to actual requirements, that is, the values 20 mV and 140 mV may be modified according to actual circuit applications.

From FIG. 4A, the output OUT of the detection circuit 305 outputs a high level of 3.3V when VI is greater than 140 mV, and only outputs a low level of 0V when VI is smaller than 20 mV. Further, the output OUT of the detection circuit 305 outputs the high level of 3.3V when VI is again greater than 140 mV.

Figure 4B:
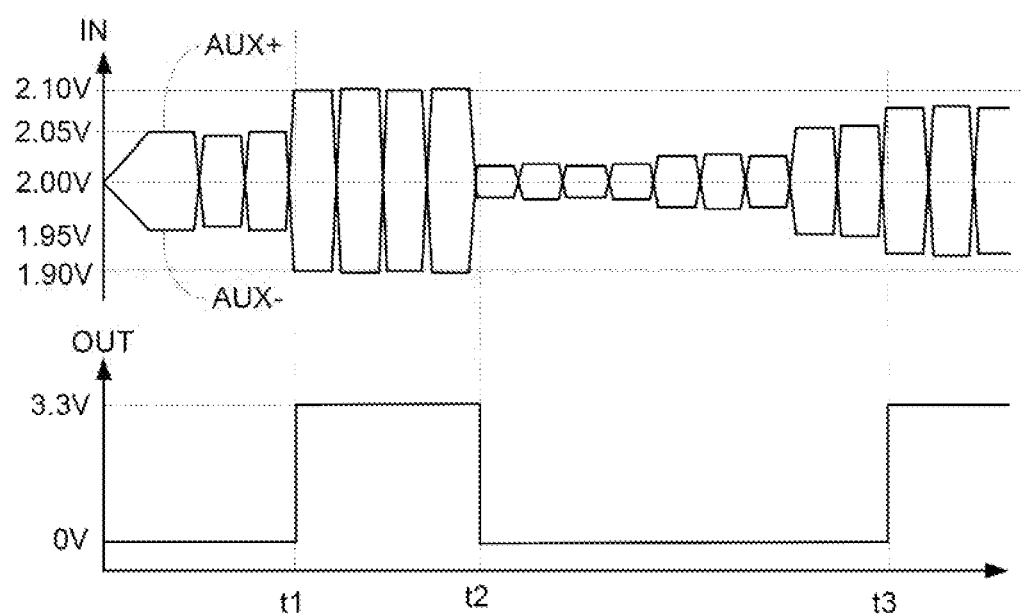
FIG. 4B is a diagram illustrating a relationship between signals among negative and positive auxiliary signal ends and an output of the detection circuit.

FIG. 4B shows a diagram illustrating a signal relationship among the positive auxiliary signal end AUX+, the negative auxiliary signal end AUX- and the output signal OUT of the detection circuit. The input IN of the detection circuit 305 receives the positive auxiliary signal end AUX+ and the negative auxiliary signal end AUX-, and the detection circuit 305 detects a difference VI between the positive auxiliary signal end AUX+ and the negative auxiliary signal end AUX-.

Before a time point t1, since VI is smaller than 20 mV, the output OUT of the detection circuit 305 is at a low level of 0V, and signal changes at the positive auxiliary signal end AUX+ and the negative auxiliary signal end AUX- are considered as noise. At the time point t1, since VI is greater than 140 mV, the output OUT of the detection circuit 305 is at a high level of 3.3V, and signal changes of the positive auxiliary signal end AUX+ and the negative auxiliary signal end AUX- can then be determined as the communication signal.

In FIG. 4B, at a time point t2, since VI is smaller than 20 mV, the output OUT of the detection circuit 305 is at a low level of 0V. At a time point t3, since VI is greater than 140 mV, the output OUT of the detection circuit 305 is at a high level of 3.3V.

Figures 5A, 5B:
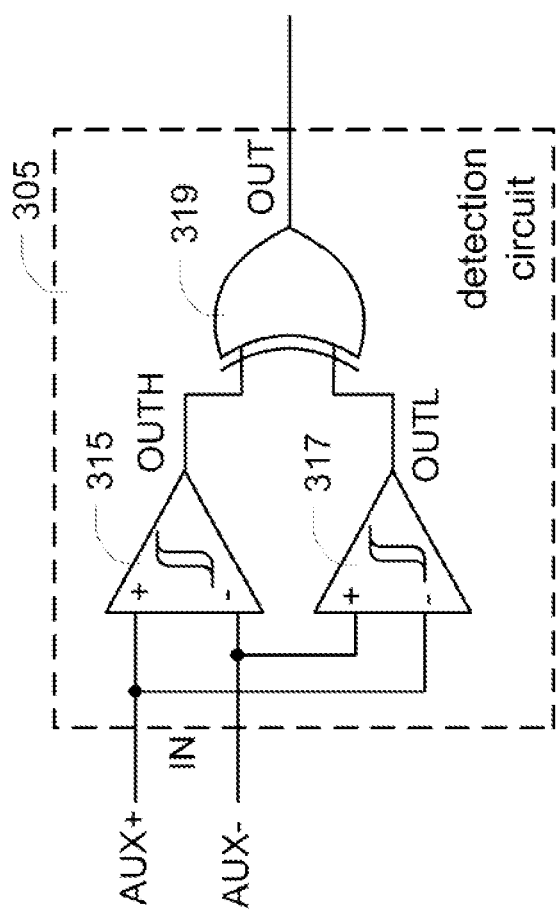
FIG. 5A is a circuit diagram of the detection circuit in a display system according to an embodiment of the present invention.
FIG. 5B is a truth table for signals in the detection circuit according to an embodiment of the present invention.

FIG. 5A shows a circuit diagram of the detection circuit 305 in the display system 30 according to an embodiment of the present invention. When the communication signal is received by the detection circuit 305, the output OUT of the detection circuit 305 outputs an indication signal of a first level, e.g. high level. The detection circuit 305 comprises a hysteresis comparator 315, a second hysteresis comparator 317, and an XOR gate 319. The first hysteresis comparator 315 has its positive input end (+) connected to the positive auxiliary signal end AUX+ of the DP 303, and its negative input end (−) connected to the negative auxiliary signal end AUX- of the DP 303. The second hysteresis comparator 317 has its positive input end (+) connected to the negative auxiliary signal end AUX- of the DP 303, and its negative input end (−) connected to the positive auxiliary signal end AUX+ of the DP 303. The first hysteresis comparator 315 and the second hysteresis comparator 317 respectively have their output connected to a first input and a second input of the XOR gate 319. The XOR 319 has its output as the output OUT of the detection circuit 305.

By implementing the first hysteresis comparator 315 and the second hysteresis comparator 317, the detection circuit 305 is able to prevent misjudgment resulted by the noise in the auxiliary signal pair. FIG. 5B shows a truth table of signals in the detection circuit 305. When the levels of signals outputted from the output OUTH of the first hysteresis comparator 315 and the output OUTL of the second hysteresis comparator 317 are different, the output OUT of the detection circuit 305 outputs the indication signal of the first level, e.g., a high level. Thus, XOR 319 outputs the indication signal of the first level after the detection circuit 305 receives the communication signal.

With the description of the above embodiment, it is illustrated that, when the display system 30 is unable to learn whether the display system is hot-plugged to the host 32 via the SDM in the event that the version of the DisplayPort standards adopted by the DPs of the host 32 and the display system 30 are different, the display system 30 of the present invention is nevertheless capable of learning whether the display system 30 is hot-plugged to the host 32 via the communication signal received by the detection circuit 305. The indication signal outputted by the detection circuit 305 may be utilized for activating the DP engine 301, or may be utilized by the display controller 307 that quickly scans to determine whether the display system 30 is connected to the host 32 via a DisplayPort interface.

While the invention has been described by way of example and in terms of the preferred embodiment, it is to be understood that the invention is not limited thereto. On the contrary, it is intended to cover various modifications and similar arrangements and procedures, and the scope of the appended claims therefore should be accorded the broadest interpretation so as to encompass possible modifications, similar arrangements and procedures.

What is claimed is:

1. A display system, is capable of connecting to a host, comprising:
    a display controller;
    a display port (DP), comprising a main link, an auxiliary channel, and a signal detection end;
    a DP engine, coupled to the DP via the main link, the auxiliary channel and the signal detection end, for outputting an image signal to the display controller; and
    a detection circuit, coupled to the DP via the auxiliary channel, for detecting whether a communication signal is present in an auxiliary signal pair in the auxiliary channel to output an indication signal to the DP engine, wherein the indication signal indicates whether the display controller is coupled to the host, and the indication signal is asserted to activate the DP engine when said communication signal is present in said auxiliary signal pair in said auxiliary channel.

2. The display system according to claim 1, wherein the communication signal outputted from the auxiliary signal pair is a differential signal.

3. The display system according to claim 1, wherein the communication signal sent from the DP is originated from the host.

4. The display system according to claim 1, wherein the detection circuit comprises:
    a first hysteresis comparator, having a positive input connected to a first end of the auxiliary signal pair, and a negative input connected to a second end of the auxiliary signal pair;
    a second hysteresis comparator, having a positive input connected to the second end of the auxiliary signal pair, and a negative input connected to the first end of the auxiliary signal pair; and
    an XOR gate, connected to an output of the first hysteresis comparator and an output of the second hysteresis comparator, having an output for outputting the indication signal.

5. The display system according to claim 4, wherein the first hysteresis comparator and the second hysteresis comparator have a hysteresis voltage offset, which equals a first number minus a second number, with the first number being greater than the second number.

6. The display system according to claim 5, wherein between the auxiliary signal pair is a signal difference; the indication signal of a second level is generated when the signal difference is decremental and is smaller than the second number;
    and the indication signal of a first level is generated when the signal difference is incremental and is greater than the first number, and is for informing the DP engine to output the communication signal in the auxiliary signal pair.

7. A method for controlling a display system, the display system comprising a display controller, a first display port (DP) connected to a second DP of a host, and a DP engine for receiving the indication signal, the method comprising:

obtaining a signal difference of an auxiliary signal pair in an auxiliary channel of the first DP port;

generating an indication signal of a first level when the signal difference is incremental and is greater than a first number; and generating the indication signal of a second level when the signal difference is decremental and is smaller than a second number wherein, the first number is greater than the second number, and when the indication signal is the first level, it is determined that a communication signal is present in the auxiliary signal pair, and said indication signal is then sent to the DP engine for activating the DP engine to receive the communication signal and convert a signal in a main link of the DP port to an image signal to the display controller.

8. The method according to claim 7, wherein the communication signal in the auxiliary signal pair is a differential signal.

9. The method according to claim 7, wherein the communication signal outputted from the first DP port originates from the host.

10. The method according to claim 7, wherein when the indication signal is the first level, the DP port is activated to receive the communication signal and convert a signal in a main link of the DP to an image signal to the display controller.

11. The method according to claim 10, wherein the indication signal indicates whether the display controller is coupled to the host.

* * * * *